US009404724B2

(12) United States Patent
Tsujimoto et al.

(10) Patent No.: US 9,404,724 B2
(45) Date of Patent: Aug. 2, 2016

(54) DIGITAL DISPLACEMENT MEASURING INSTRUMENT

(71) Applicant: MITUTOYO CORPORATION, Kawasaki-shi, Kanagawa (JP)

(72) Inventors: Yasuhiro Tsujimoto, Kawasaki (JP); Shuji Hayashida, Kawasaki (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 669 days.

(21) Appl. No.: 13/778,766

(22) Filed: Feb. 27, 2013

(65) Prior Publication Data

US 2013/0226507 A1 Aug. 29, 2013

(30) Foreign Application Priority Data

Feb. 27, 2012 (JP) .................................. 2012-040353

(51) Int. Cl.
*G01B 3/18* (2006.01)
(52) U.S. Cl.
CPC ........................ *G01B 3/18* (2013.01)
(58) Field of Classification Search
None
See application file for complete search history.

(56) References Cited

U.S. PATENT DOCUMENTS

| 4,035,922 | A | | 7/1977 | Von Voros | |
|---|---|---|---|---|---|
| 5,062,744 | A | * | 11/1991 | Nakamura | B23G 1/16 408/8 |
| 6,286,227 | B1 | * | 9/2001 | Corby, Jr. | G01B 3/18 33/813 |

FOREIGN PATENT DOCUMENTS

| CN | 1229909 A | 9/1999 |
|---|---|---|
| CN | 1254086 A | 5/2000 |
| CN | 101639352 A | 2/2010 |
| CN | 102853727 A | 1/2013 |
| EP | 0 787 991 A1 | 8/1997 |
| EP | 2 120 003 A2 | 11/2009 |
| JP | A-2001-141402 | 5/2001 |
| JP | 2008-281449 A | 11/2008 |

OTHER PUBLICATIONS

Extended Search Report issued in European Patent Application No. 13156932.9 dated Apr. 4, 2013.

* cited by examiner

*Primary Examiner* — John Breene
*Assistant Examiner* — Jeffrey C Morgan
(74) *Attorney, Agent, or Firm* — Oliff PLC

(57) ABSTRACT

A digital displacement measuring instrument includes: a body; a spindle; an encoder; a display; a speed information detector that detects a moving speed of the spindle; a judging unit that judges whether or not the spindle is stopped based on the moving speed detected by the speed information detector and, when the judging unit judges that the spindle is stopped, judges whether or not the moving speed of the spindle just before the spindle is stopped exceeds a predetermined threshold; and a notifying unit that notifies a judgment result provided by the judging unit.

4 Claims, 5 Drawing Sheets

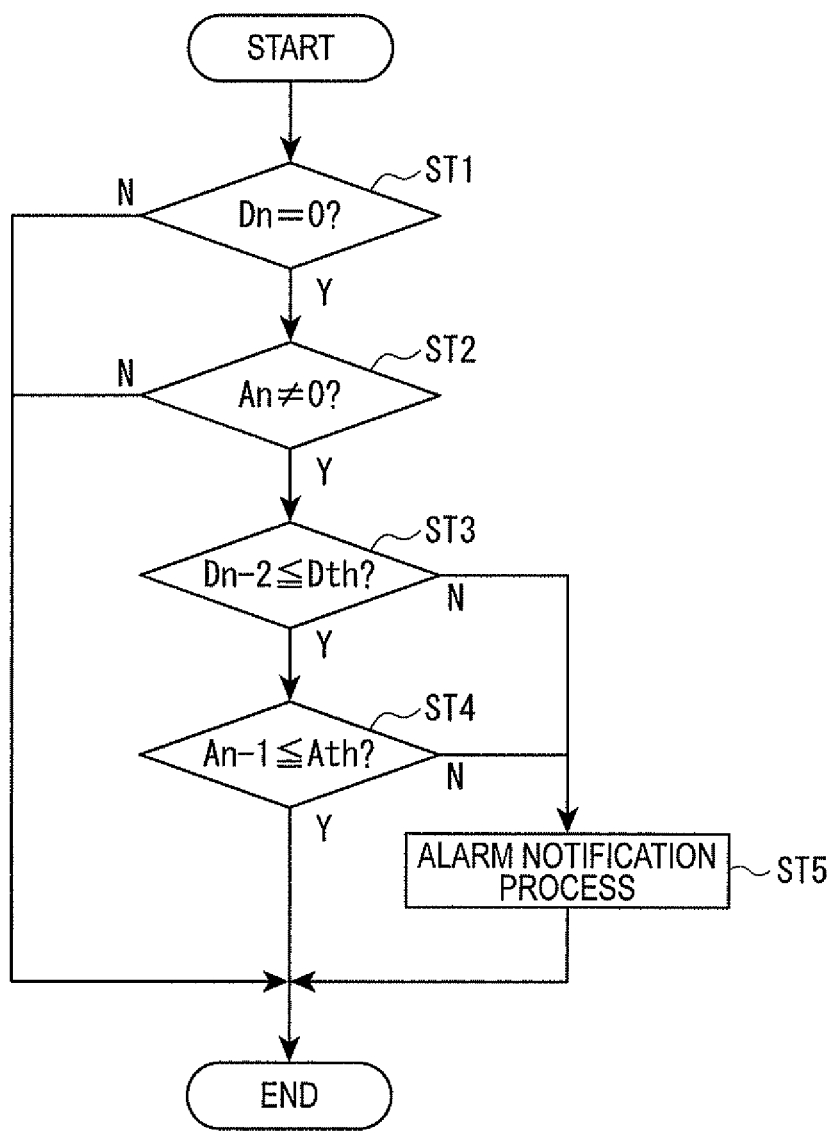

DIGITAL DISPLACEMENT MEASURING INSTRUMENT

The entire disclosure of Japanese Patent Applications No. 2012-040353 filed Feb. 27, 2012 is expressly incorporated by reference herein.

BACKGROUND OF THE INVENTION

1. Field of the Invention

The present invention relates to a digital displacement measuring instrument for measuring a dimension or the like of an object to be measured based on a displacement of a spindle.

2. Description of Related Art

A digital micrometer using a lead screw has been known as one of digital displacement measuring instruments.

A digital micrometer includes a body, a spindle that is screwed into the body to be axially moved, an encoder that detects a displacement of the spindle, and a display that digitally displays the displacement of the spindle detected by the encoder.

In a typical digital micrometer, a measuring force is controlled at a constant level is used for reducing variance of measurement values.

For example, there has been known a micrometer that includes a rotatable operation sleeve at an outer end of the spindle and a constant pressure mechanism (e.g., a ratchet mechanism) interposed between the spindle and the operation sleeve. In the micrometer, when a predetermined load or more is applied on the spindle, the constant pressure mechanism is actuated to idle the operation sleeve, thereby controlling a measuring pressure at a constant level (see Patent Literature 1: JP-A-2001-141402).

However, in the above-mentioned micrometer, even using the constant pressure mechanism in order to control the measuring force at a constant level, measurement results vary depending on a moving speed of the spindle when the spindle is brought into contact with an object to be measured. This is because, in an arrangement where the spindle is screwed into the body, threaded portions of the spindle and the body easily bite each other by a wedge effect. Particularly, since a biting amount differs depending on the moving speed of the spindle when the spindle is brought into contact with the object, the measurement results vary.

Recently, in response to a demand for high efficiency, a lead of a threaded portion of the spindle is configured to be large. Since the moving speed of the spindle becomes higher in this configuration, the measurement results are more likely to vary.

SUMMARY OF THE INVENTION

An object of the present invention is to provide a digital displacement measuring instrument capable of reducing variance of measurement results caused by a moving speed of a spindle when the spindle is brought into contact with an object to be measured.

According to an aspect of the invention, a digital displacement measuring instrument includes: a body; a spindle that is screwed into the body to be axially moved; an encoder that detects a displacement of the spindle; a display that displays the displacement of the spindle detected by the encoder; a speed information detector that detects a moving speed of the spindle; a judging unit that judges whether or not the spindle is stopped based on the moving speed detected by the speed information detector and, when the judging unit judges that the spindle is stopped, judges whether or not the moving speed of the spindle just before the spindle is stopped exceeds a predetermined speed threshold; and a notifying unit that notifies a judgment result provided by the judging unit.

With this arrangement, when the spindle is rotated for measurement, the spindle is axially moved in accordance with rotation thereof. Since a displacement of the spindle is detected by the encoder, a dimension and the like of the object can be measured based on the displacement of the spindle.

In the above aspect of the invention, in the measurement, after a speed information detector detects the moving speed of the spindle, a judging unit judges whether the spindle is stopped or not based on the detected moving speed. Here, after the spindle is judged to have stopped, the judging unit judges whether or not the moving speed of the spindle just before the spindle is stopped (i.e., a moving speed in a sampling time by two of those prior to the sampling time when the spindle is judged to have stopped) exceeds a predetermined threshold. A judgment result is notified by the notifying unit. For instance, the notifying unit notifies that the moving speed of the spindle just before the spindle is stopped exceeds the predetermined threshold, or that the moving speed of the spindle just before the spindle is stopped does not exceed the predetermined threshold.

Accordingly, by this notification, an operator can recognize that the spindle has been brought into contact with the object at the moving speed of the spindle just before the spindle is stopped higher than the predetermined threshold, or that the spindle has been brought into contact with the object at an appropriate moving speed of the spindle just before the spindle is stopped within the predetermined threshold. Accordingly, when the spindle has been brought into contact with the object at the moving speed of the spindle just before the spindle is stopped higher than the predetermined threshold, the operator can restart the measurement. Consequently, variance of the measurement results caused by the moving speed of the spindle when the spindle is brought into contact with the object can be reduced. Furthermore, variance of the measurement results depending on the operator can be reduced.

In the digital displacement measuring instrument according to the above aspect of the invention, it is preferable that the speed information detector calculates the moving speed of the spindle based on the displacement of the spindle detected by the encoder.

With this arrangement, the moving speed of the spindle can be calculated by sampling the displacement of the spindle, which is detected by the encoder, at every predetermined time. In other words, using the encoder of the digital displacement measuring instrument for detecting the displacement of the spindle, the moving speed of the spindle can be detected. Accordingly, since the digital displacement measuring instrument does not require another speed detector, the digital displacement measuring instrument can be produced economically.

In the digital displacement measuring instrument according to the above aspect of the invention, it is preferable that the speed information detector calculates an acceleration of the spindle just before the spindle is stopped based on the moving speed of the spindle, and the judging unit judges that the spindle is stopped when the moving speed detected by the speed information detector is zero and the acceleration is not zero.

With this arrangement, since the judging unit judges whether the spindle is stopped or not in consideration of acceleration just before the spindle is stopped (i.e., acceleration in a sampling time by one of that prior to the sampling time when the spindle is judged to have stopped) in addition to the moving speed of the spindle just before the spindle is stopped, the moving speed detected by the speed information detector, the judging unit can precisely judge that the spindle in a moving condition comes at the stop.

In the digital displacement measuring instrument according to the above aspect of the invention, it is preferable that the notifying unit notifies an alarm when the moving speed of the spindle just before the spindle is stopped exceeds the predetermined speed threshold, or when the acceleration of the spindle just before the spindle is stopped exceeds a predetermined acceleration threshold.

With this arrangement, the notifying unit notifies an alarm when the moving speed of the spindle just before the spindle is stopped exceeds the predetermined threshold or when the acceleration just before the spindle is stopped exceeds the predetermined threshold, for instance, by displaying an error message on the display, buzzing, or turning on/off a lamp. Accordingly, the operator can immediately recognize that the spindle has been brought into contact with the object at the moving speed or the acceleration of the spindle, which exceeds the predetermined threshold.

BRIEF DESCRIPTION OF THE DRAWINGS

FIG. 5 is a flowchart showing a process of a processor in the above exemplary embodiment.

DESCRIPTION OF EMBODIMENT(S)

An exemplary embodiment of the present invention will be described below with reference to drawings.

Although a digital displacement measuring instrument is exemplified by a digital micrometer in this exemplary embodiment, the invention is not limited to the digital micrometer.

Arrangement of Digital Micrometer

Figure 1:
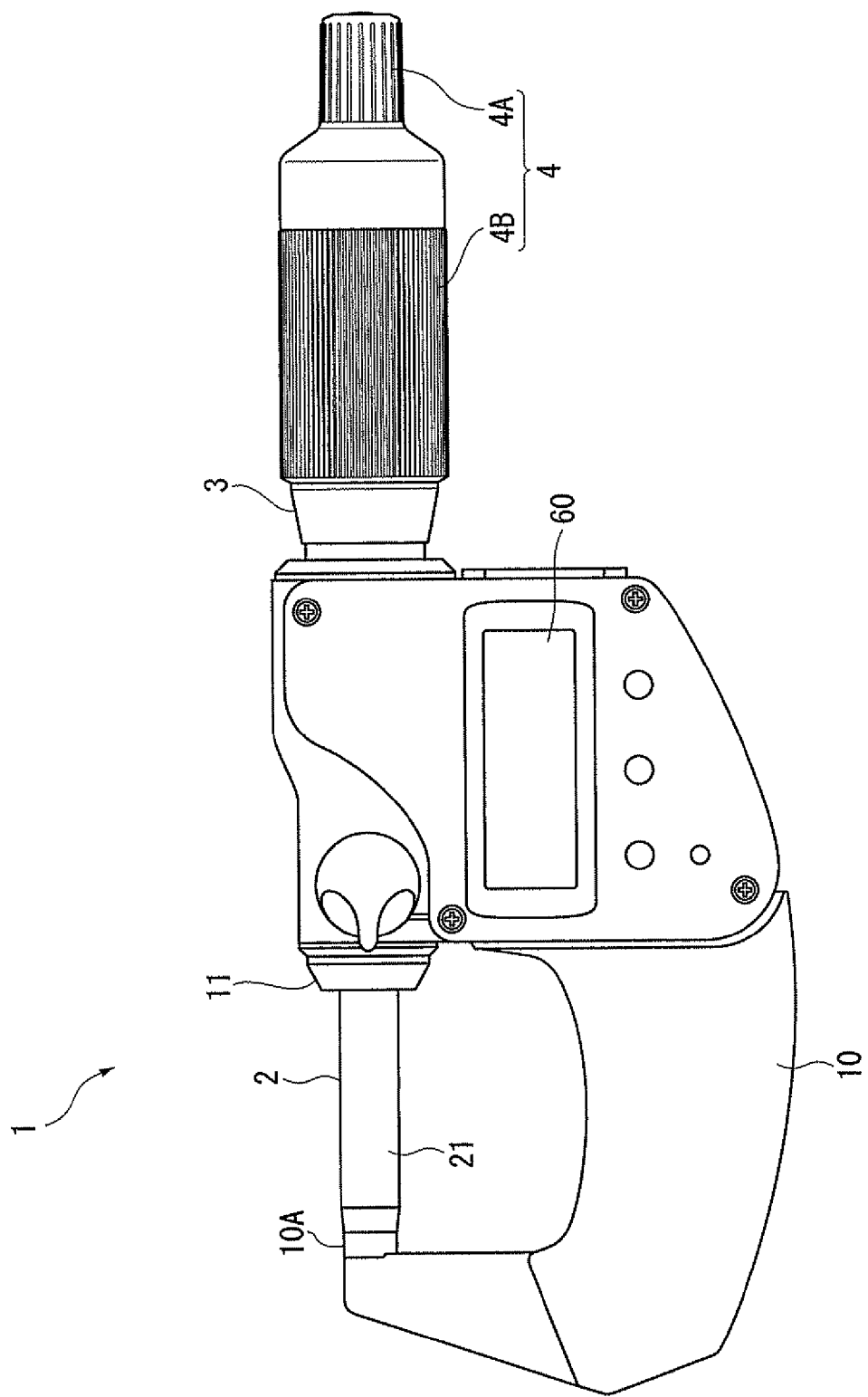
FIG. 1 is a front elevation showing a digital micrometer according to an exemplary embodiment of the invention.
Figure 2:
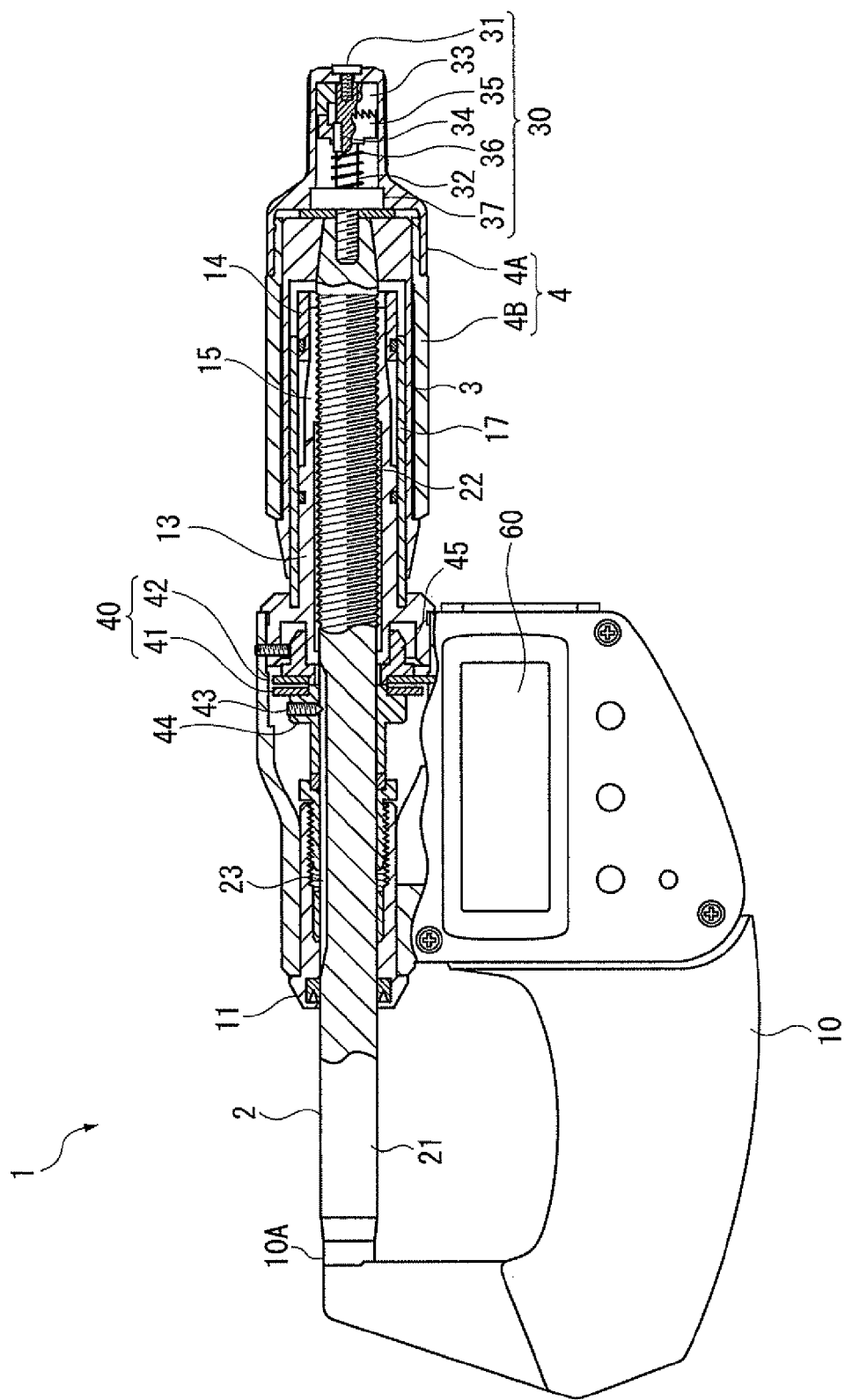
FIG. 2 is a partial cross section of the above exemplary embodiment.

FIG. 1 is a front elevation showing the digital micrometer according to the exemplary embodiment. FIG. 2 is a partial cross section showing the digital micrometer.

In FIGS. 1 and 2, a digital micrometer 1 includes: a substantially U-shaped body 10; a spindle 2 that is screwed into the body 10 to be axially moved; an encoder 40 that detects a displacement of the spindle 2 inside the body 10; and a display 60 that displays the displacement (position detection value) of the spindle 2 which is detected by the encoder 40.

An anvil 10A is fixed to one end of the body 10 while a sleeve 11 for slidably supporting the spindle 2 is attached to the other end of the body 10. The sleeve 11 is formed substantially cylindrical. The spindle 2 is inserted in an inner circumference of the sleeve 11 and supported. Moreover, a substantially cylindrical inner sleeve 13 is attached to the body 10 coaxially with the sleeve 11. A thimble 3 provided on an outer circumference of the inner sleeve 13 is rotated to advance and retract the spindle 2 relative to the anvil 10A.

The spindle 2 includes: a spindle body 21 and a threaded shaft 22 which are in alignment; and a cross-sectionally V-shaped key groove 23 that is axially formed on an outer circumference of the spindle body 21.

One end of the inner sleeve 13 provided in an axial direction of the spindle 2 is held by the body 10. A female thread is formed on an inner circumference of the other end of the inner sleeve 13. The threaded shaft 22 of the spindle 2 is screwed in this female thread. A male thread is formed on an outer circumference of the other end of the inner sleeve 13. A tapered nut 14 is screwed to this male thread. In a predetermined position of the inner sleeve 13 where the male thread is threaded, three slits are axially formed to provide a three-way split portion 15. When the tapered nut 14 is rotated to be advanced and retracted in the axial direction of the inner sleeve 13, a degree of tightness of the three-way split portion 15 is changed, so that a degree of fitting between the spindle 2 and the inner sleeve 13 is adjusted.

An outer sleeve 17 is fixed to the outer circumference of the inner sleeve 13. The cylindrical thimble 3 covering an outer circumference of the outer sleeve 17 is connected to an outer end of the spindle 2 (an end opposite to the anvil 10A) via a support shaft 32 and a flange 37.

An operation sleeve 4 is provided from an outer circumference of the thimble 3 to the outer end of the spindle 2. The operation sleeve 4, which is rotatably provided to the spindle 2, includes: a first operation portion 4A that is disposed at the outer end of the spindle 2 and has a smaller diameter than a diameter of the outer sleeve 17; and a second operation portion 4B that is fitted into the first operation portion 4A and in which the outer circumference of the outer sleeve 17 is fitted.

A constant pressure mechanism 30 that runs idle when a predetermined load or more is applied on the spindle 2 is provided between the first operation portion 4A of the operation sleeve 4 and the outer end of the spindle 2. The constant pressure mechanism 30 may be alternatively provided between the second operation portion 4B of the operation sleeve 4 and the outer circumference of the spindle 2.

The constant pressure mechanism 30 includes: the support shaft 32 having one end screwed in the outer end of the spindle 2 and having the other end that rotatably supports the operation sleeve 4 via a screw 31; a first ratchet wheel 33 fixed to an inner circumference of the first operation portion 4A; a second ratchet wheel 35 engaged with the first ratchet wheel 33 and provided to the support shaft 32 via a key 34 in a manner incapable of rotating around the support shaft 32 and displaceable in the axial direction of the support shaft 32; a helical compression spring 36 that biases the second ratchet wheel 35 toward the first ratchet wheel 33; and a flange 37 that supports one end of the helical compression spring 36 and is fixed to the support shaft 32.

When the operation sleeve 4 is rotated, the first ratchet wheel 33 fixed to the first operation portion 4A is rotated together with the operation sleeve 4. Since the first ratchet wheel 33 is engaged with the second ratchet wheel 35, the second ratchet wheel 35 is also rotated. When the second ratchet wheel 35 is rotated, the support shaft 32 is rotated via the key 34, whereby the spindle 2 in which the support shaft 32 is screwed and the thimble 3 integrated with the spindle 2 are also rotated together with the operation sleeve 4.

On the other hand, under a predetermined load or more applied on the spindle 2, the second ratchet wheel 35 is difficult to rotate. Thus, when the operation sleeve 4 is further rotated to rotate the first ratchet wheel 33, the second ratchet wheel 35 is moved toward the helical compression spring 36 along the key 34 against the helical compression spring 36. In other words, a rotation power of the first ratchet wheel 33 is not transmitted to the second ratchet wheel 35 and therefore the operation sleeve 4 runs idle, thereby keeping constant pressure.

The encoder 40 is an electromagnetic-induction-type encoder, which includes a rotor 41 that rotates in a circumferential direction of the spindle 2 and a stator 42 that faces the rotor 41 with a predetermined gap therebetween and is fixed to the body 10.

The rotor 41, which is formed substantially in a doughnut-shaped plate, includes an electrode pattern of a coil (not shown) on a surface near the stator 42. A surface of the rotor 41 opposite to the stator 42 is engaged with a rotor bushing 44 (rotor holding member). The rotor bushing 44 includes an engaging key 43 engageable with the key groove 23 of the spindle 2. A position adjusting screw 51 for restraining the rotor bushing 44 from moving in a direction opposite to the stator 42 in the axial direction of the spindle 2 is screwed in an inner circumference of the sleeve 11 opposite to the stator 42 across the rotor bushing 44.

The stator 42 includes a substantially doughnut-plate-shaped stator ring provided on the outer circumference of the spindle 2 and a plate-shaped stator extension provided on an outer circumference of the stator ring to be stretched toward the inside of the body 10. The stator ring has an electrode pattern formed by a transmission coil and a receiver coil for detecting a rotation angle of the rotor 41 by electromagnetically coupling to the electrode pattern of the rotor 41. A surface of the stator ring, which is opposite to the rotor 41, is held by a stator bushing 45 fixed to the inner sleeve 13 (i.e., the body 10). In other words, the stator 42 is fixed to the inner sleeve 13 (i.e., the body 10) via the stator bushing 45 in the vicinity of the spindle 2 so as not to be displaceable in the axial direction of the spindle 2.

Figure 3:
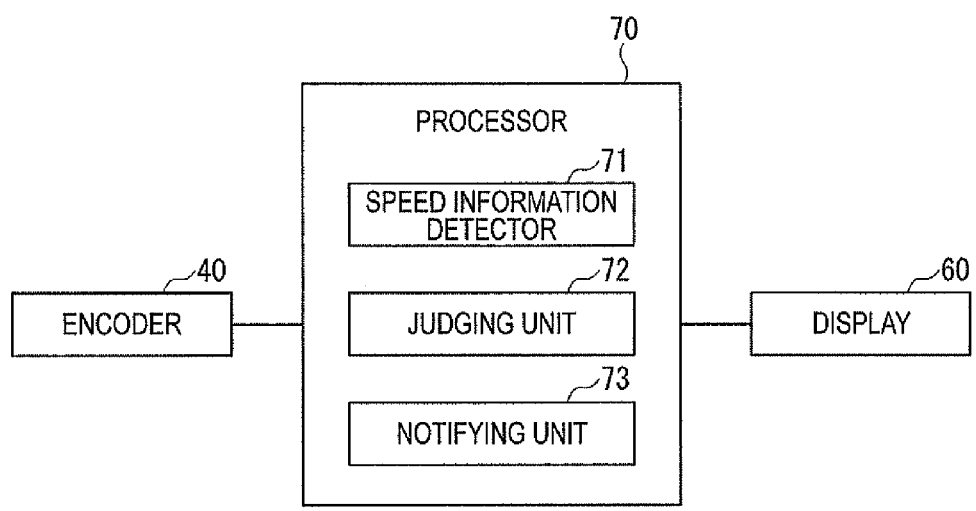
FIG. 3 is a control block diagram of the above exemplary embodiment.

FIG. 3 shows a processor 70 that processes a signal from the encoder 40 and displays the processed signal on the display 60.

The processor 70 includes: a speed information detector 71 that collects at every predetermined time t the position detection value of the spindle 2 detected by the encoder 40 and calculates the moving speed and the acceleration of the spindle 2; a judging unit 72 that judges whether or not the spindle 2 is stopped based on the moving speed and the acceleration of the spindle 2 detected by the speed information detector 71 and, when the judging unit 72 judges that the spindle 2 is stopped, judges whether or not the moving speed of the spindle 2 just before the spindle is stopped and the acceleration of the spindle 2 just before the spindle 2 is stopped exceed the respective predetermined thresholds; and a notifying unit 73 that notifies a judgment result of the judging unit 72.

In the exemplary embodiment, the notifying unit 73 performs an alarm notification process, specifically, displays an error message on the display 60 when the moving speed of the spindle 2 just before the spindle is stopped or the acceleration of the spindle 2 just before the spindle 2 is stopped exceeds the respective predetermined thresholds.

How to Use Digital Micrometer and Effects

For measurement, the thimble 3 is rotated. Then the spindle 2 is advanced and retracted relative to the anvil 10A, whereby an end surface of the spindle 2 and the anvil 10A are brought into contact with to-be-measured portions of the object. At this time, the rotation of the spindle 2 is transmitted to the rotor 41 through the key groove 23, the engaging key 43 and the rotor bushing 44. The rotation angle of the rotor 41 detected by the encoder 40 is converted into the axial displacement of the spindle 2 to be displayed on the display 60.

While the end surface of the spindle 2 and the anvil 10A are in contact with the to-be-measured portions of the object, the second ratchet wheel 35 is difficult to rotate. Thus, even when the operation sleeve 4 is rotated, the second ratchet wheel 35 is moved toward the helical compression spring 36 along the key 34 against the helical compression spring 36. Accordingly, the rotation power of the first ratchet wheel 33 is not transmitted to the second ratchet wheel 35 and therefore the operation sleeve 4 runs idle, thereby keeping constant pressure.

During the measurement, the displacement of the spindle 2 detected by the encoder 40 (i.e., the position detection value) is collected by the speed information detector 71 of the processor at every predetermined time t.

Figure 4:
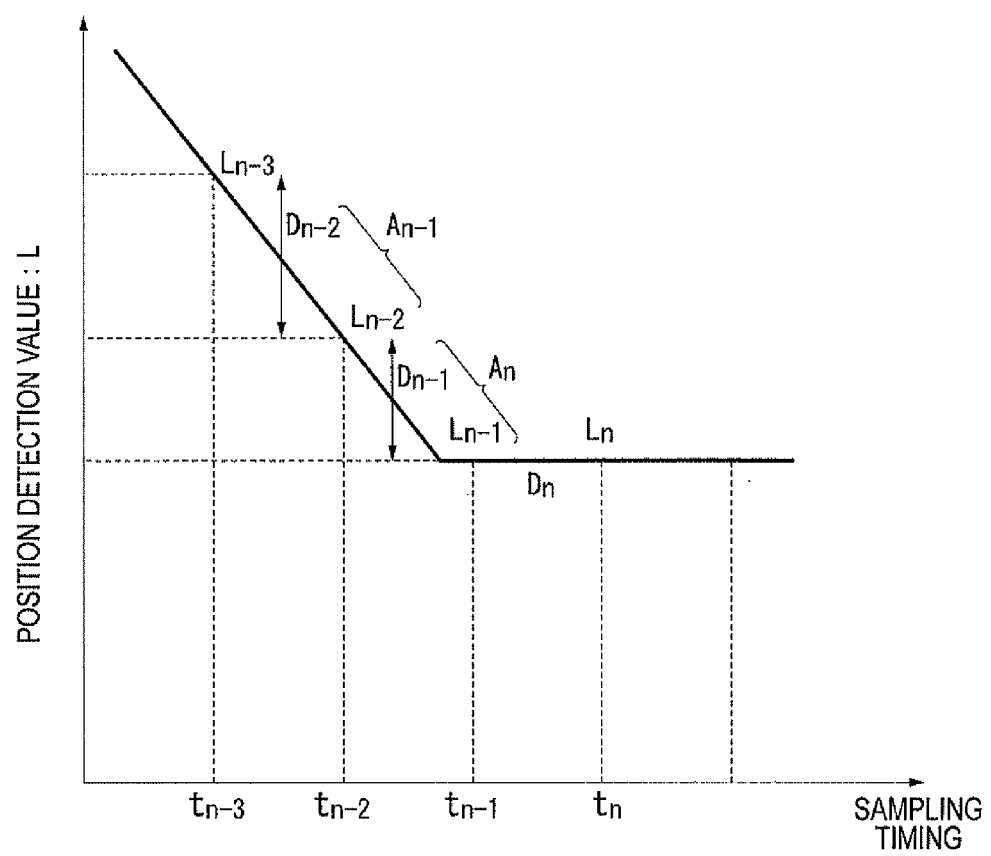
FIG. 4 shows a position detection value before and after the spindle is stopped in the above exemplary embodiment.

As shown in FIG. 4, provided that the position detection value collected at the time of tn is defined as Ln, the position detection values collected at the time of tn-1, tn-3 and so on prior to the time of tn are defined as Ln-1, Ln-2, Ln-3 and so on, the displacement (moving speed) per predetermined time t between the position detection values is defined as Dn, Dn-1, Dn-2 and so on, and the acceleration is defined as An, An-1 and so on, the speed information detector 71 calculates the moving speed Dn and the acceleration An of the spindle 2 according to the following formulae.

$$Dn = Ln - (Ln-1)$$

$$An = Dn - (Dn-1)$$

The processor 70 performs a judgment process (ST1 to ST4) and the alarm notification process (ST5) according to a flowchart shown in FIG. 5.

Firstly, the judging unit 72 judges whether the moving speed Dn of the spindle 2 calculated by the speed information detector 71 is zero or not (ST1). In ST1, when the moving speed Dn of the spindle 2 is not zero, the process is terminated. When the moving speed Dn of the spindle 2 is zero, the judging unit 72 judges whether the acceleration An is zero or not in ST2. In ST2, when the acceleration An is zero, the process is terminated. When the acceleration An is not zero, the judging unit 72 judges that the spindle 2 is stopped.

Subsequently, when the judging unit 72 judges that the spindle 2 is stopped, in ST3, the judging unit 72 judges whether or not the moving speed Dn-2 of the spindle 2 just before the spindle 2 is stopped is equal to or less than a predetermined speed threshold Dth, in other words, whether or not the moving speed Dn-2 of the spindle 2 just before the spindle 2 is stopped exceeds the speed threshold Dth. When the moving speed Dn-2 of the spindle 2 just before the spindle 2 is stopped is equal to or less than the speed threshold Dth, the process proceeds to ST4. When the moving speed Dn-2 of the spindle 2 just before the spindle 2 is stopped exceeds the speed threshold Dth, the process proceeds to ST5 to perform the alarm notification process.

In ST4, the judging unit 72 judges whether or not the acceleration An-1 of the spindle 2 just before the spindle 2 is stopped is equal to or less than a predetermined acceleration threshold Ath, in other words, whether or not the acceleration An-1 of the spindle 2 just before the spindle 2 is stopped exceeds the predetermined acceleration threshold Ath. When the acceleration An-1 of the spindle 2 just before the spindle 2 is stopped is equal to or less than the acceleration threshold Ath, the process is terminated. When the acceleration An-1 of the spindle 2 just before the spindle 2 is stopped exceeds the acceleration threshold Ath, the process proceeds to ST5 to perform the alarm notification process.

It should be noted that the thresholds Dth and Ath are changed as needed according to a screw pitch of the threaded shaft 22 of the spindle 2 and a display resolution.

In ST5, the notifying unit 73 displays an error message (e.g., "Error") on the display 60.

Accordingly, since the operator can recognize, by the error message displayed on the display 60, that the spindle 2 has been brought into contact with the object at the moving speed of the spindle 2 during the measurement which is higher than the predetermined threshold, the operator can restart the measurement. Consequently, variance of the measurement results caused by the moving speed of the spindle 2 when the spindle 2 is brought into contact with the object can be reduced.

In the exemplary embodiment, the speed information detector 71 can calculate the moving speed and the acceleration of the spindle 2 by sampling at every predetermined time the displacement of the spindle 2 detected by the encoder 40. In other words, using the encoder 40 for detecting the displacement of the spindle 2, which is typically provided in a measuring instrument, the moving speed and the acceleration of the spindle 2 can be calculated. Accordingly, since the digital micrometer does not require another speed detector, the digital micrometer can be produced economically.

Since the judging unit 72 judges that the spindle 2 is stopped when the moving speed detected by the speed information detector 71 is zero and the acceleration detected by the speed information detector 71 is not zero, the judging unit 72 can precisely judge that the spindle 2 is stopped.

Moreover, since the notifying unit 73 notifies the alarm when the moving speed of the spindle 2 just before the spindle 2 is stopped exceeds the predetermined threshold or when the acceleration when the spindle 2 is stopped exceeds the predetermined threshold, the notifying unit 73 can precisely notify the operator that the spindle 2 has been brought into contact with the object at the moving speed or the acceleration of the spindle 2 exceeding the predetermined threshold.

Modifications

The scope of the invention is not limited to the above exemplary embodiment, but includes modifications and improvements as long as an object of the invention can be achieved.

In the above exemplary embodiment, the speed information detector 71 calculates the moving speed and the acceleration of the spindle 2 based on the position detection value detected by the encoder 40. However, the encoder 40 may not be used. For instance, alternatively, a speed detector for detecting the moving speed of the spindle 2 may be separately provided.

In the above exemplary embodiment, the judging unit 72 judges whether the spindle 2 is stopped or not based on the moving speed and the acceleration of the spindle 2. However, the judging unit 72 may judge that the spindle 2 is stopped only based on the moving speed of the spindle 2.

The judging unit 72 judges that the spindle 2 is stopped and then judges whether or not the moving speed of the spindle 2 just before the spindle 2 is stopped and the acceleration of the spindle 2 just before the spindle 2 is stopped are equal to or less than the threshold. However, only the moving speed of the spindle 2 just before the spindle 2 is stopped may be compared with the threshold.

In the above exemplary embodiment, the notifying unit 73 displays the error message on the display 60 when the moving speed of the spindle 2 just before the spindle 2 is stopped or the acceleration of the spindle 2 just before the spindle 2 is stopped is judged as exceeding the predetermined threshold, however, the arrangement of the notifying unit 73 is not limited thereto.

For instance, a buzzer or a display lamp may be provided. When the moving speed of the spindle 2 just before the spindle 2 is stopped or the acceleration of the spindle 2 just before the spindle 2 is stopped is judged as exceeding the predetermined threshold, the buzzer may be actuated, or the display lamp may be turned on/off.

Alternatively, the judgment result on whether or not the moving speed of the spindle 2 just before the spindle 2 is stopped or the acceleration of the spindle 2 just before the spindle 2 is stopped exceeds the predetermined threshold may be directly notified. In other words, when the moving speed of the spindle 2 just before the spindle 2 is stopped or the acceleration of the spindle 2 just before the spindle 2 is stopped is equal to or less than the predetermined threshold, the judgment result may be directly notified.

In the above exemplary embodiment, the digital displacement measuring instrument is exemplified by the digital micrometer 1, however, application of the invention is not limited thereto. For instance, the invention may be applied on any mechanisms such as a digital micrometer head, which includes a spindle 2 slidably provided to a body 10 and an encoder 40 for detecting the displacement of the spindle 2.

The constant pressure mechanism 30 that runs idle when a predetermined load or more is applied on the spindle 2 may not necessarily be provided.

The encoder 40 is not limited to the electromagnetic-induction-type encoder exemplarily described in the above exemplary embodiment. It is only required that the encoder 40 is a digital encoder capable of detecting the relative rotation of the rotor 41 to the stator 42. For example, the encoder 40 may be an optical encoder, electrostatic encoder or the like.

What is claimed is:

1. A digital displacement measuring instrument, comprising:
    a body;
    a spindle that is screwed into the body to be axially moved;
    an encoder that detects a displacement of the spindle;
    a display that displays the displacement of the spindle detected by the encoder;
    a speed information detector that detects a moving speed of the spindle;
    a judging unit that judges whether or not the spindle is stopped based on the moving speed detected by the speed information detector and, when the judging unit judges that the spindle is stopped, judges whether or not the moving speed of the spindle just before the spindle is stopped exceeds a predetermined speed threshold; and
    a notifying unit that notifies a judgment result provided by the judging unit.

2. The digital displacement measuring instrument according to claim 1, wherein
    the speed information detector calculates the moving speed of the spindle based on the displacement of the spindle detected by the encoder.

3. The digital displacement measuring instrument according to claim 2, wherein
    the speed information detector calculates an acceleration of the spindle just before the spindle is stopped based on the moving speed of the spindle, and
    the judging unit judges that the spindle is stopped when the moving speed detected by the speed information detector is zero and the acceleration is not zero.

4. The digital displacement measuring instrument according to claim 3, wherein
    the notifying unit notifies an alarm when the moving speed of the spindle just before the spindle is stopped exceeds the predetermined speed threshold, or when the acceleration of the spindle just before the spindle is stopped exceeds a predetermined acceleration threshold.

* * * * *